«12» United States Patent
Bachmann et al.

[19]

[11] Patent Number: 6,131,955
[45] Date of Patent: Oct. 17, 2000

[54] EXPANSION JOINT WITH THERMAL TRANSITION CONNECTOR

[75] Inventors: Lothar Bachmann, Auburn; Roger Woodward, Brunswick, both of Me.

[73] Assignee: Bachmann Industries, Auburn, Me.

[21] Appl. No.: 09/370,480

[22] Filed: Aug. 9, 1999

Related U.S. Application Data

[60] Provisional application No. 60/095,971, Aug. 10, 1998.

[51] Int. Cl.[7] .................................................. F16L 55/00
[52] U.S. Cl. .......................... 285/47; 285/300; 285/229; 285/904
[58] Field of Search ........................ 285/47, 299, 300, 285/301, 229, 904

[56] References Cited

U.S. PATENT DOCUMENTS

| 2,998,270 | 8/1961 | Watkins | 285/265 |
|---|---|---|---|
| 3,730,566 | 5/1973 | Kazmierski | 285/229 |
| 4,023,782 | 5/1977 | Eifer | 285/47 |
| 4,047,740 | 9/1977 | Young et al. | 285/47 |
| 4,848,803 | 7/1989 | Bachmann | 285/47 |
| 5,378,026 | 1/1995 | Ninacs et al. | 285/47 |
| 5,658,024 | 8/1997 | Bachmann et al. | 285/299 |

FOREIGN PATENT DOCUMENTS

| 2424286 | 11/1975 | Germany | 285/47 |
|---|---|---|---|
| 7101090 | 7/1972 | Netherlands | 285/904 |
| 1634938 | 3/1991 | U.S.S.R. | 285/904 |

*Primary Examiner*—Eric K. Nicholson
*Attorney, Agent, or Firm*—Pierce Atwood; Chris A. Caseiro

[57] ABSTRACT

A modified expansion joint to provide a transition from one conduit to an adjacent conduit. The expansion joint includes a flexible coupling member and an angled transition leg having insulation on both sides thereof. The flexible coupling member takes up any variations in dimensional differences between the adjacent conduits. The transition leg provides a gradual thermal transition from a hot upstream conduit to a downstream conduit at a lower exterior surface temperature.

10 Claims, 1 Drawing Sheet

EXPANSION JOINT WITH THERMAL TRANSITION CONNECTOR

CROSS-REFERENCE TO RELATED APPLICATION

This application claims the benefit of the priority of provisional U.S. application Ser. No. 60/095,971, filed Aug. 10, 1998, entitled "EXPANSION JOINT WITH THERMAL TRANSITION CONNECTOR" and assigned to a common assignee.

BACKGROUND OF THE INVENTION

1. Field of the Invention

The present invention relates to systems for transporting fluids from one location to another. More particularly, the present invention relates to an apparatus to accommodate variations in component dimensions associated with temperature changes. Still more particularly, the present invention relates to expansion joints that connect fluid transport devices having fluids therein at significantly different temperatures. The present invention is an expansion joint that accommodates dimensional changes between adjacent fluid transport devices.

2. Description of the Prior Art

Expansion joints are used in many industries, including, but not limited to, the power generating industry. Expansion joints allow the relative movement of conduits (ducting, piping, etc.) used to control the flow of gases from one location to another. In the power generating industry in particular, the gases that are generated and that are to be diverted are very hot as they exit a turbine associated with a primary power generator. The hot turbine gases may either be exhausted directly via an exhaust stack or they may be directed to a secondary power generator. The secondary power generator may be used to recover a substantial portion of the thermal energy of the turbine exhaust gases. The gases generated by the turbine rise rapidly and place significant thermal stress on all components of a system in contact with those very hot gases. The expansion joint is designed to absorb thermal expansion in the exhaust ducting due to temperature changes. It is also designed to alleviate that thermal stress that comes from the transition from a "hot" fluid temperature zone to a "cold" fluid temperature zone. The expansion joint must therefore be designed specifically to accommodate a combination of all the above-noted duties.

U.S. Pat. No. 5,658,024 issued to Bachmann et al. describes the importance of the proper design of an expansion joint. The background section of the Bachmann patent is incorporated herein by reference. The Bachmann patent describes a new expansion joint design that eases the stress of any of the transitions associated with the connection between hot conduits having external insulation (a hot frame) and cold conduits having internal insulation (a cold frame). Of course, this can mean any transition wherein the temperature at the interior surface of one conduit is substantially different from the temperature at the exterior surface of an adjacent conduit.

In the power generating industry for example, it may be of importance to ensure that the exterior surface of a downstream conduit does not exceed a predetermined temperature. In some circumstances that temperature may be 65° C. or less. At the same time, the interior surface of an adjacent upstream conduit in direct contact with the hot fluid being transported may be at 600° C. or more. The prior Bachmann expansion joint provides one way of maintaining structural integrity in the coupling of the two adjacent conduits while also accounting for differentials in axial and lateral movement of those conduits as a function of temperature differentials. in particular, the prior Bachmann expansion joint includes a flexible material as an intermediary link between one end of the joint itself and the downstream conduit. The other end of the expansion joint is rigidly connected to the upstream conduit. A channel formed of one or more metal parts links the two ends of the expansion joint together. That channel includes a mouth within which fluid dwells.

The channeled Bachmann joint is designed with angled walls to form the mouth for capturing flowing fluid. Those angled walls are also intended to provide a geometry that is more tolerant of thermal stresses. Under most conditions, the angled-walls channel design is suitable to reduce sufficiently to acceptable levels the thermal stresses experienced in fluid flow conduits. However, the ability of the expansion joint element to perform at elevated temperatures is limited and, under some conditions, particularly those in which fluid temperatures are very high (600° C. or more), it is advantageous for the exterior of an adjacent conduit to be at ambient temperature.

As noted, the prior Bachmann expansion joint includes a channeled section. That channeled section includes a metal-to-metal connection at its exterior surface, proximate to the exterior surface of the downstream conduit. The fluid within the mouth of the channeled section remains very hot. At the same time, the temperature at the exterior of the adjacent downstream internally-insulated conduit will be approximately at ambient. The flexible coupling that connects the exterior of the channeled section to the exterior of the downstream conduit is therefore subject to significant thermal stress due to the significant thermal gradient between its two contact points. Specifically, since the fluid within the mouth of the channeled section remains very hot, that end of the flexible coupling is also very hot. In fact, the temperature may exceed the temperature limitations of the flexible coupling material. Further, at transition areas of the channel, such as at the leg-to-base interfaces, there remains substantial thermal stress. That stress may cause weakening or failure of the expansion joint and, together with the flexible coupling's temperature limitation may cause potentially significant development of hazardous conditions caused by escaping fluid. Repair and maintenance costs may also be significant.

Therefore, what is needed is an expansion joint that accommodates differences in dimensional changes in adjacent fluid conduits. What is also needed is an expansion joint that is formed so that it is subject to minimal thermal distortion of the type that would cause its failure. Further, what is needed is an expansion joint design in which both ends of the expansion coupling are essentially at ambient temperature so as to ensure longevity of that coupling.

SUMMARY OF THE INVENTION

It is an object of the present invention to provide an expansion joint that accommodates differences in dimensional changes in adjacent fluid conduits. It is also an object of the present invention to provide an expansion joint that is formed so that it is subject to minimal thermal distortion of the type that would otherwise cause its failure. Further, it is an object of the present invention to provide an expansion joint design in which both ends of the expansion coupling are essentially at ambient temperature so as to ensure longevity of that coupling.

These and other objects of the present invention are achieved by providing a modified expansion joint design that includes a single angled transition leg. The single angled transition leg is coupled between an upstream conduit and an outlet frame. The outlet frame is connected to a downstream conduit by way of the same sort of flexible coupling described in the prior Bachmann patent. The length and specific angle of the transition leg may be varied as a function of operating conditions and dimensional constraints associated with the particular fluid transfer system. Insulative material is applied to both sides of the transition leg. The insulative material acts to isolate the transition leg from contact with the hot fluid passing through the upstream and downstream conduits. This isolation allows a gradual cooling of the transition leg from a temperature that is substantially the same as the temperature at the interior of the hot conduit to a temperature that is substantially the same as the exterior surface of the downstream conduit. The insulative material accommodates expansion of the transition leg, which expansion tends to be radial into the insulative material and which varies with the change in temperature of the transition leg. Although thermal transition legs have been applied in other limited situations, none has been coupled to a flexible material in the way noted so as to provide for a thermally effective expansion joint. The prior Bachmann design teaches away from that type of arrangement by permitting the temperature variations of the flexible coupling noted, which variations may exceed the temperature limitations of that coupling, particularly when the channel is subjected to increasingly higher fluid temperatures.

There are several apparent benefits from the use of a thermal transition leg in conjunction with the flexible coupling to create the expansion joint of the present invention. First, the elimination of the channel of the prior expansion joint reduces fluid turbulence caused by the mouth transition. Second, thermal stresses associated with the channel legs and base of the prior design are eliminated. Finally, the new expansion joint of the present invention may be used to replace bellows joints that have been used in certain systems. Bellows joints are designed to establish a transition between adjacent conduits that may be subject to differing thermal stresses. Unfortunately, the prior metal bellows are subject to the same thermal distortions developed in any expansion joint. As operating temperatures continue to increase, failure of those metal bellows becomes increasingly likely due to fatigue. The modified expansion joint of the present invention is designed to perform the same task of transitioning from one conduit to another. It does so structurally as well as thermally and is therefore a suitable replacement for a metal bellows in many instances.

These and other advantages of the present invention will become more apparent upon review of the following detailed description and the accompanying drawing.

DETAILED DESCRIPTION OF THE PREFERRED EMBODIMENT OF THE INVENTION

Figure 1:
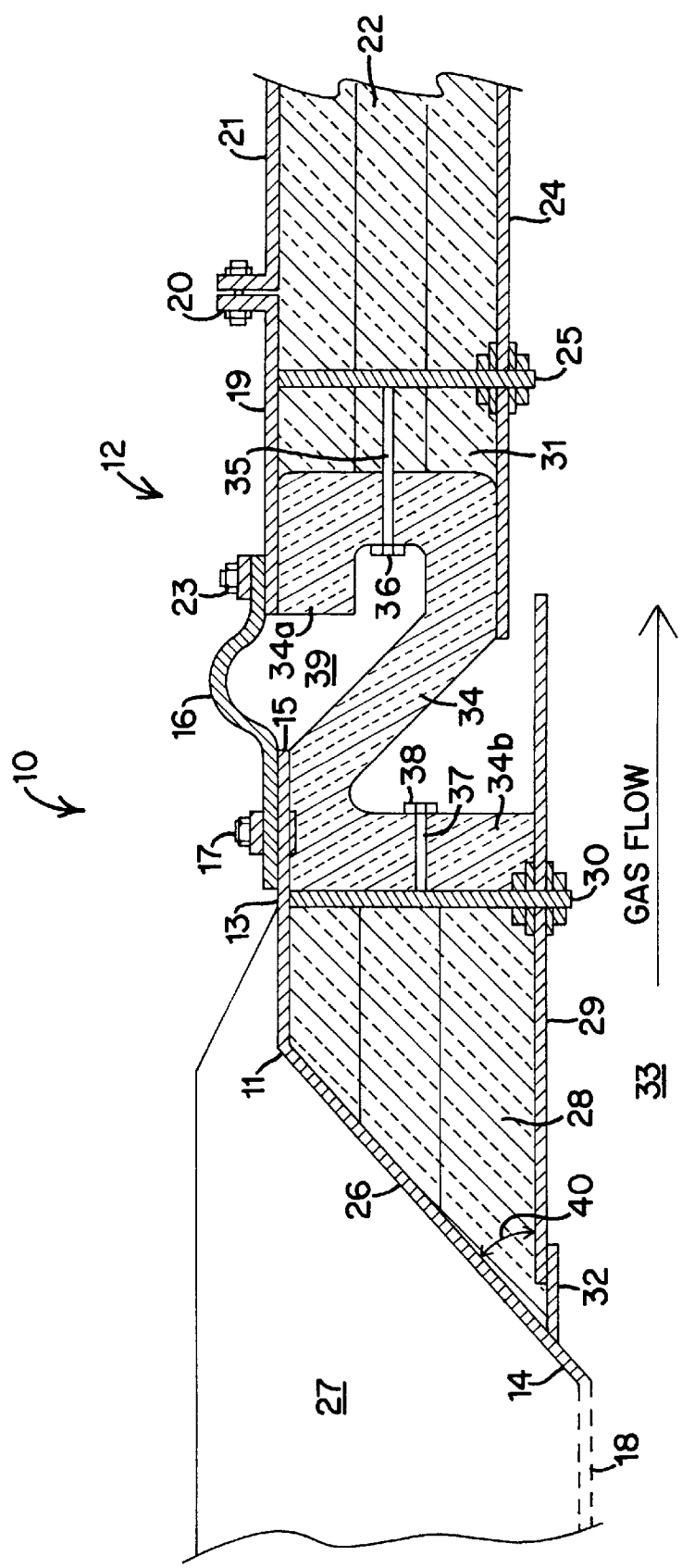
FIG. 1 is a simplified cross-sectional elevation view of a modified expansion joint of the present invention.

A modified expansion joint 10 of the present invention is illustrated in FIG. 1. The expansion joint includes a transition leg 11 and a downstream connector 12. The transition leg 11 includes a first end 13 and a second end 14. The first end 13 includes a connector leg 15 that is connected to a flexible expansion material 16 of connector 12, preferably by first bolting means 17. The second end 14 of leg 11 is coupled to an upstream conduit 18, preferably by welding. The upstream conduit 18 may be, for example, a turbine conduit.

The downstream connector 12 includes the flexible expansion material 16, and a coupling plate 19. A second bolting means 20 connects the coupling plate 19 to a downstream conduit 21 having interior conduit insulation 22. A third bolting means 23 couples the flexible material 16 to the plate 19. Interior liner 24 is preferably a bridge panel that captures insulation 22 therein by means of one or more studs such as stud 25.

The only direct connection between the transition leg 11 and the downstream connector 12 is the flexible material 16. The flexible material 16 is preferably refractory, ceramic, or high-temperature insulation material. It is the flexible material 16 that is free to move in order to accommodate any change in dimensional characteristics of the transition leg 11. However, the transition leg 11 is insulated in a manner to be described herein such that the temperature of the flexible coupling material 16 is substantially the same at the contact points associated with bolting means 17 and 23.

The transition leg 11 includes an angled portion 26 that is surrounded by an exterior insulative transition material 27 and an interior insulative transition material 28. It is the combination of transition materials 27 and 28 that ensures the temperature of the angled portion 26 of the transition leg 11 will cool in a gradual and uniform way from the second end 14 to the connector leg 15. Exterior insulative material 27 may be minimally coupled to the transition leg 11 while interior insulative material 28 is preferably captured by means of a transition liner 29 that is connected to the transition leg 11 by one or more of a transition liner support stud 30. Shelf 32 is tacked to end 14 and it provides a support for liner 29 to expand on to as the temperature of the fluid within space 33 increases.

Angled portion 26 may be of any suitable length. Its length is a function of the temperatures involved as well as the insulation K value required to ensure that the temperature of leg 11 at end 13 is substantially equivalent to the temperature of plate 19. Preferably, angle 40 of angled section 26 is about 15° to about 25° from the base of liner 29. However, it is to be understood that that may be modified as a function of specific design parameters.

A connector insulative material 31 operates as a transition insulator between the downstream connector 12 and insulative material 22 of conduit 21. A first end 34a of insulative material 34 is coupled to connector insulative material 31 by way of one or more studs such as stud 35 that is connected to stud 25. Stud 35 is preferably used to capture material 34 using speed clips 36. Similarly, stud 37 and speed clips 38 connect a second end 34b of material 34 to stud 30. Material 34 acts as a dome seal for thermal and acoustic insulation purposes in regard to space 39. Insulative materials 22, 28, and 31 may be formed of a suitable block or blanket insulative composition of fairly high quality and K value. Material 34 is preferably a blanket insulative material also with high K value. Exterior insulative material 27 may be of lower quality and lower K value than that employed for the other insulative components. However, it is to be understood that particular insulative qualities and values will be dependent upon the particular operating conditions within space 33 and the desired temperatures at the exterior of flexible material 16.

It can be seen that the liners 24 and 29, and leg 11 are all arranged and coupled such that thermal expansion is accommodated by way of the particular insulative material adjacent thereto. Additionally, the flexible material 16 permits movement of the entire hotter upstream side of the joint 10 upward without effect on the positioning of the downstream section of the joint 10. This design permits the user to choose from a wide array of materials to create flexible material 16 without concern of thermal degradation in that the application is a benign one.

Although the present invention has been described and illustrated with specific reference to certain detailed designs, it will be apparent to those skilled in this field that alternative embodiments will achieve the same results without deviating from the basic concept of the invention. All such embodiments and their equivalents are deemed to be within the scope of the invention as set out in the description.

We claim:

1. An expansion joint to provide a coupling between: i) a first conduit capable of transporting a fluid and having external insulation of a certain thickness thereon; and ii) a second conduit capable of transporting the fluid and having internal insulation of a certain thickness thereon, the expansion joint comprising:

a. a transition leg couplable to the first conduit, said transition leg having an angled portion with a first end for coupling to the first conduit and a second end fixed to a connector leg thereof, wherein said angled portion forms an obtuse angle between said first end and said second end;

b. a connector frame couplable to the second conduit; and c. a flexible connector connected to said connector leg and for connecting said transition leg to said connector frame, wherein said angled portion of said transition leg extends at an angle away from said connector leg toward the first conduit.

2. The expansion joint as claimed in claim 1 wherein said angled portion of said transition leg has an exterior face and an interior face, wherein said exterior face is in contact with the exterior insulation of the first conduit.

3. The expansion joint as claimed in claim 2 further comprising an interior transition insulation material designed to be in contact with said interior face of said angled portion.

4. The expansion joint as claimed in claim 3 further comprising a liner for retaining said interior transition insulation material adjacent to said interior face of said angled portion.

5. The expansion joint as claimed in claim 4 wherein said liner includes a first end and a second end, said transition leg further comprising a liner shelf coupled to said first end of said angled portion for slidably retaining said first end of said liner thereon as the expansion joint expands and contracts.

6. The expansion joint as claimed in claim 5 wherein said connector frame includes a first end coupled to said flexible connector, a second end couplable to the second conduit, and a connector plate therebetween having an interior face and an exterior face, said expansion joint further comprising a connector insulative material adjacent to said interior face of said connector plate.

7. The expansion joint as claimed in claim 6 further comprising a transition insulative material retained within a space between said transition leg and said connector frame.

8. The expansion joint as claimed in claim 7 wherein said flexible connector is a high-temperature insulation material selected from the group consisting of refractory or ceramic insulation materials.

9. The expansion joint as claimed in claim 1 wherein said angled portion of said transition leg is sized and angled such that its temperature at said first end thereof is substantially the same as the first temperature in the first conduit and near ambient temperature at said second end thereof.

10. The expansion joint as claimed in claim 9 wherein said angled portion is angled at an angle of about 15° to about 25° from a plane defined by said connector leg of said transition leg.

\* \* \* \* \*